United States Patent [19]

Coombes et al.

[11] 3,958,228

[45] May 18, 1976

[54] FAULT TOLERANT LEAST RECENTLY USED ALGORITHM LOGIC

[75] Inventors: Daniel J. Coombes, Glen Ellyn, Ill.; Benedicto U. Messina, Poughkeepsie, N.Y.

[73] Assignee: International Business Machines Corporation, Armonk, N.Y.

[22] Filed: Mar. 20, 1975

[21] Appl. No.: 560,421

[52] U.S. Cl. .............................................. 340/172.5
[51] Int. Cl.² ........................................... G06F 7/00
[58] Field of Search ........................................ 445/1

[56] References Cited
UNITED STATES PATENTS

3,588,829   6/1971   Boland et al..................... 340/172.5

*Primary Examiner*—R. Stephen Dildine, Jr.
*Attorney, Agent, or Firm*—Robert W. Berray

[57] ABSTRACT

Binary logic is added to the binary logic normally utilized for the purpose of generating and decoding binary code combinations which reflect the order of use of a number of units, utilized in sequence, to thereby indicate the unit least recently used (LRU). Disclosed is the utilization of six binary bits which are updated in accordance with a sequence of use of four units to thereby indicate the least recently used one of the four units. In accordance with known LRU techniques, there are 24 valid binary bit combinations that reflect the sequence of use of the four units. The provision of 6 binary bits in the LRU code are capable of assuming 64 different permutations, therefore 40 combinations of binary bits are considered invalid when utilizing the LRU code. The present invention utilizes certain of the invalid binary bit combinations to identify units that have been removed from further use because of a fault condition, and which code continues to identify the sequence of use of those units which have not been eliminated from further use. The code chosen to identify a faulty unit and the sequence of use of the remaining units is fault tolerant in that additional errors in the coding mechanism can be tolerated, and ignored, while maintaining the ability to identify faulty units and sequence of use of the remaining units.

5 Claims, 8 Drawing Figures

FIG. 3A LRU UPDATE FOR NORMAL (FAULT FREE) CODE POINTS

FIG. 5  FAILURE MODE LRU UPDATE

FAULT TOLERANT LEAST RECENTLY USED ALGORITHM LOGIC

BACKGROUND OF THE INVENTION

1. Field of Invention

The present invention relates to the logic implementation of at least recently used (LRU) algorithm and more particularly to the use of a binary code reflecting the sequence of use of a plurality of units wherein units may be eliminated from use and identified by the code, which code retains the ability to reflect the sequence of use of the remaining units.

2. Description of Prior Art

The present invention finds use in data processing systems wherein a finite number of identical units are utilized in a random sequence, and wherein use of the units must be shared. When one of the units must be assigned to a new use, the one least recently used in the prior sequences is identified for assignment to the new use. In particular, the present invention has been incorporated into a data processing system which utilizes a high speed buffer between a main storage device and a central processing unit. The high speed buffer and associated address array are divided into congruent classes. That is, the high speed buffer is divided into a plurality of sections, each provided with a plurality of addressable entries, and wherein sets of data from the main storage device are to be assigned to a related predetermined entry in one of the plurality of sections in the high speed buffer. The section assigned being the least recently used by the data processing system.

A more complete description of a high speed buffer system divided into congruent classes, and which includes a description of the operation of a least recently used algorithm for replacement purposes, can be found in U.S. Pat. No. 3,588,829 entitled "Integrated Memory System With Block Transfer To A Buffer Store" by Boland et al, issued June 28, 1971 and assigned to the assignee of the present invention. This identified patent is herewith incorporated by reference for the necessary understanding of the need for a least recently used (LRU) algorithm in the environment of a high speed buffer divided into congruents classes. The LRU algorithm is implemented by the updating and decoding of chronology bits.

As further background information representing one form of binary logic for implementing a least recently used algorithm, reference is made to an article entitled "Logical Push-Down List" by J. S. Liptay in the IBM Technical Disclosure Bulletin Vol. 10, No. 10, March 1968, page 1541. As indicated previously, there are a number of invalid binary code combinations which can be assumed by the binary bits reflecting the LRU code. One method of detecting such invalid codes is disclosed in an article entitled "Parallel Validity Checking Of Ordering Or Ranking Vectors", by J. L. Craft in the IBM Technical Disclosure Bulletin Vol. 9, No. 2, July 1966, page 169–170.

SUMMARY OF THE INVENTION

The problem to be overcome in a data processing system which incorporates a high speed buffer as disclosed in the above cited U.S. Pat. No. 3,588,829 is the action to take when some portion of the storage system fails. One method of tolerating errors in the storage system would be to provide, with the data, in the various storage devices, error checking and correcting codes. This however becomes expensive and at times performance degrading. Another alternative is to physically, or logically, remove certain portions of the storage system from further use, but this usually entails removing a larger portion than absolutely necessary in response to an error in some minor portion. No matter what technique is used, prior systems would be degraded in such a way that no further errors could be tolerated in the system without requiring complete shut down of the system.

A primary object of the present invention is to provide apparatus for implementation of a least recently used (LRU) algorithm which generates and decodes chronology bits capable of identifying faulty units and providing the least recently used indication of the remaining units.

It is another object of this invention, to provide apparatus for generating and decoding chronology bits in an LRU algorithm in which error conditions can be tolerated in both the units being used and in the generation of the chronology bits themselves.

These and other objects are achieved in an LRU chronology coding in which special apparatus is provided to utilize binary bit combinations which would normally be considered invalid in previous LRU implementations. The invalid code combinations are utilized in special hardware to provide an indication of faulty units removed from use in the data processing system, but which codes retain the ability to provide the LRU indication for the remaining units. Further, the coding of chronology bits is such that even after the special hardware has been brought into use, when a unit has been removed from the system, further error conditions can be tolerated in the generation of the chronology bits without affecting the ability to identify the operable unit least recently used.

DETAILED DESCRIPTION OF THE INVENTION

Figure 1:
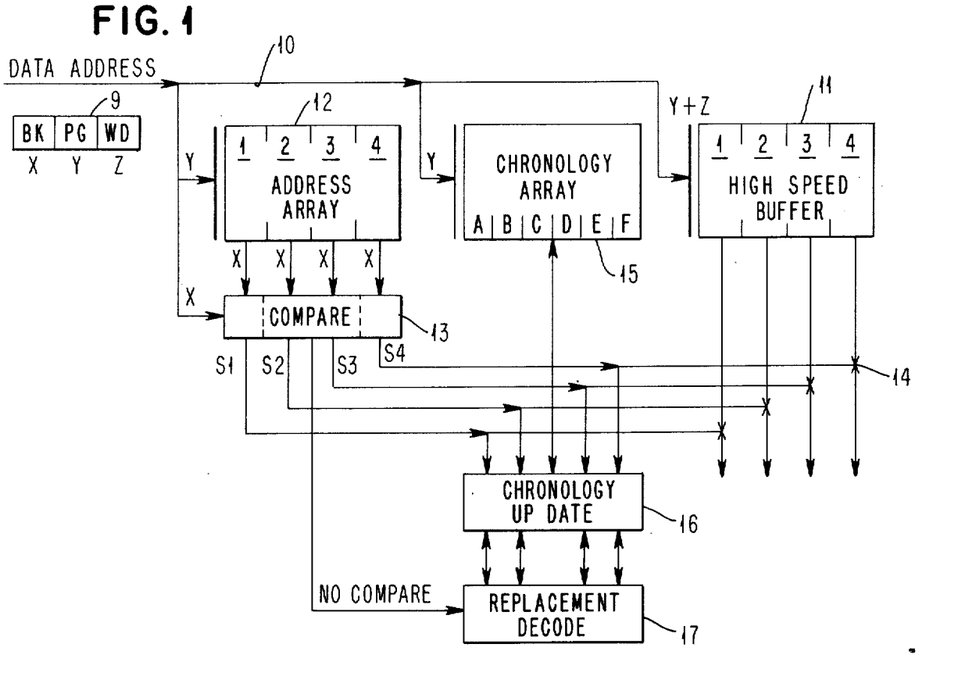
FIG. 1 is a block diagram of a set-associative high speed buffer storage system utilizing chronology bits to provide a least recently used (LRU) algorithm.

FIG. 1 will be utilized to set the environment for use of the present invention. The use depicted is in a high speed buffer storage system utilized in a data processing system. The above referenced U.S. Pat. No. 3,588,829 provides a detailed description of such a system.

A central processing unit presents to a storage system a data address on line 10. This data address identifies a particular word of data in a main storage device. As data is accessed from the main storage system, the data is placed in a high speed buffer 11 along with address information, identifying the data, which is placed in an address array 12. The address information provided on line 10 from the central processing unit is depicted at 9 and comprises a number of binary bits. A number of binary bits Z identify one of a plurality of words (WD), a number of binary bits Y identify one of a plurality of pages (PG), and a number of binary bits X identify one of a plurality of books (BK), providing a breakdown of data within the main storage device. As shown in FIG. 1, the address array 12 and high speed buffer 11 are each comprised of four sections and contain a number of addressable locations equal to $2^{Y-1}$. By providing four sections in the high speed buffer 11 and address array 12, and providing addressable locations identified by the binary bits Y of an address, a high speed buffer storage system is provided which is known as a four-way set associative storage system.

The four-way set associative mapping technique derives its name from the fact that the same page from any one of the plurality of books in the main storage device must be placed in an associated addressed location of one of the four sections of the high speed buffer 11. For example, the data contained in page 8 of any identified book contained in the main storage device must be placed in addressed location 8 of one of the four sections of the high speed buffer 11. The identity of a particular book (X bits) from which the page 8 was referenced, will be placed in the associated section of the address array 12 at addressed location 8. Therefore, when address information is presented on line 10 requesting data, the Y address bits are utilized to access the addressed location in all four sections of the address array 12. To determine whether or not the requested page presently contained in one of the four sections of the high speed buffer 11 is the page associated with the book identified by the X address bits, a compare circuit 13 is provided. If the requested page is contained in one of the four sections of the high speed buffer 11, the X address bits identifying the book from which the page came will be compared with the requested book address bits in compare circuit 13 and a signal will be generated on one of the lines identified as S1, S2, S3 or S4. While the comparison is being made in compare circuit 13, the Y and Z address bits will be accessing corresponding locations in all four sections of the high speed buffer 11. If the requested page and word are contained in the high speed buffer 11, one of the signals S1 through S4 will be utilized to gate the requested data from the high speed buffer 11 to the central processing unit. These gates are represented by the designation shown at 14. If the data requested on address line 10 is not contained in the high speed buffer 11, the address information is utilized to access the main storage device to obtain the requested data for placement in one of the four sections of the high speed buffer 11. The associated book address information (X bits) will also be placed in the address array 12.

As described in the above cited patent, and readily apparent from the previous description, all four sections of the high speed buffer 11 associated with a particular page number will soon be filled. When it becomes necessary to access new data from the main storage device for placement in the high speed buffer 11, it becomes necessary to select one of the four sections to be utilized to receive the new data.

As taught in the above cited patent, the technique utilized to select a particular one of the four sections to receive the new data utilizes a least recently used (LRU) algorithm. In accordance with this known technique, the sequence of use of the four sections can be identified by the coding of six binary bit combinations. There is thus provided in FIG. 1 in accordance with this known technique, a chronology array 15. Each location in the chronology array 15, identified by the Y address bits, contains six binary bit positions A through F. Each time data is accessed from the high speed buffer 11, the chronology array 15 will be accessed at the associated location identified by the address bits Y, and chronology bits will be presented to circuitry identified as chronology update 16. The chronology update circuitry 16 responds to the present binary state of the chronology bits from the chronology array 15, and generation of one of the signals S1–S4, to provide a new bit combination of the chronology bits for storage in the chronology array 15.

When a request for data is presented on address line 10, and it is determined that the data must be obtained from the main storage device for placement into the high speed buffer 11, the particular one of the four sections associated with the address bits Y to be utilized in accordance with the LRU algorithm will be indicated in circuitry which responds to the chronology bits from the chronology array 15. This replacement decode circuitry 17 responds to a signal from compare circuit 13 which indicates that there was no comparison, and provides the identity of the one of the four sections of the high speed buffer 11 to receive the data accessed from the main storage device.

As mentioned in the introduction, the sequence of use, or chronology, of four units can be represented by certain code combinations of six binary bits. Table I shown below depicts the valid binary bit combinations of positions A–F in the chronology array 15, for all possible sequences of use of the four sections of the high speed buffer 11.

TABLE I

| Chronology Sequence | A 1B2 | B 1B3 | C 1B4 | D 2B3 | E 2B4 | F 3B4 |
|---|---|---|---|---|---|---|
| 1 2 3 4 | 1 | 1 | 1 | 1 | 1 | 1 |
| 1 2 4 3 | 1 | 1 | 1 | 1 | 1 | 0 |
| 1 3 2 4 | 1 | 1 | 1 | 0 | 1 | 1 |
| 1 3 4 2 | 1 | 1 | 1 | 0 | 0 | 1 |
| 1 4 2 3 | 1 | 1 | 1 | 1 | 0 | 0 |
| 1 4 3 2 | 1 | 1 | 1 | 0 | 0 | 0 |
| 2 1 3 4 | 0 | 1 | 1 | 1 | 1 | 1 |
| 2 1 4 3 | 0 | 1 | 1 | 1 | 1 | 0 |
| 2 3 1 4 | 0 | 0 | 1 | 1 | 1 | 1 |
| 2 3 4 1 | 0 | 0 | 0 | 1 | 1 | 1 |
| 2 4 1 3 | 0 | 1 | 0 | 1 | 1 | 0 |
| 2 4 3 1 | 0 | 0 | 0 | 1 | 1 | 0 |
| 3 1 2 4 | 1 | 0 | 1 | 0 | 1 | 1 |
| 3 1 4 2 | 1 | 0 | 1 | 0 | 0 | 1 |
| 3 2 1 4 | 0 | 0 | 1 | 0 | 1 | 1 |
| 3 2 4 1 | 0 | 0 | 0 | 0 | 1 | 1 |
| 3 4 1 2 | 1 | 0 | 0 | 0 | 0 | 1 |
| 3 4 2 1 | 0 | 0 | 0 | 0 | 0 | 1 |
| 4 1 2 3 | 1 | 1 | 0 | 1 | 0 | 0 |
| 4 1 3 2 | 1 | 1 | 0 | 0 | 0 | 0 |
| 4 2 1 3 | 0 | 1 | 0 | 1 | 0 | 0 |
| 4 2 3 1 | 0 | 0 | 0 | 1 | 0 | 0 |
| 4 3 1 2 | 1 | 0 | 0 | 0 | 0 | 0 |
| 4 3 2 1 | 0 | 0 | 0 | 0 | 0 | 0 |

The designation in Table I, such as 1B2 or 2B4, associated with bits A and E respectively, signifies that section 1 was selected before 2 (1B2) and that section 2 was selected before section 4 (2B4). If, for example, any of the bit combinations of A-F shown in the first six entries is present, the replacement decoder 17 of FIG. 1 would signify that section 1 of high speed buffer 11 was the least recently used, and should be selected to receive new data being entered into the high speed buffer 11 from the main storage device.

As indicated earlier, the binary code combinations shown in TABLE I are the only valid combinations reflecting the LRU algorithm. Any other combinations would be considered invalid. The six binary bits A-F are capable of assuming 64 combinations, such that there are 40 combinations of the binary bits considered to be invalid in accordance with prior teachings.

In accordance with the present invention, examination of the information shown in TABLE I has revealed that various patterns exist in the valid and normally invalid bit combinations which, when analyzed, permit the utilization of logic in addition to that normally used, which permits use of certain invalid bit combinations to be utilized for identifying which of the four sections of the high speed buffer 11 or address array 12 are unusable for some reason, but permits the combination of bits A-F to be utilized for the purpose of identifying the chronology of use for all remaining operable units.

Figure 2:
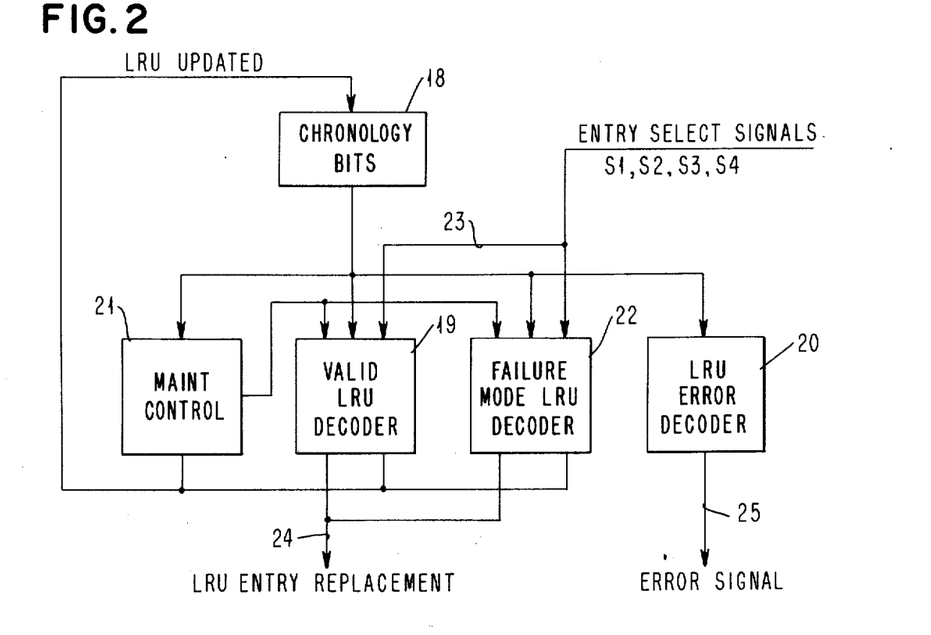
FIG. 2 is a block diagram of the apparatus utilized for generating, or updating, chronology bits, and for decoding of chronology bits in either a valid or failure mode situation.

In accordance with the teaching of the present invention, additional logic is provided as shown generally in FIG. 2. As shown in FIG. 2, the major components of this block diagram include a storage of chronology bits 18, a valid LRU decoder 19 and an LRU error decoder 20, all of which are present in prior LRU systems. Also present in many data processing systems is a maintenance control 21 which is utilized for diagnostics and reconfiguration purposes, and which is utilized to detect the presence of faulty units. In accordance with the teachings of the present invention, further logic is provided in the form of a failure mode LRU decoder 22. In accordance with the particular select signals S1-S4 generated in compare circuit 13 of FIG. 1, and as provided on line 23, either decoder 19 or decoder 22 will be effective to provide the LRU updated combination of chronology bits in the storage 18. The particular one of the decoders 19 or 22 which will be effective will be indicated by the maintenance control 21. Further, in the absence of a signal S1-S4, decoders 19 and 22 will be effective to signal on a line 24 the particular one of the sections in the high speed buffer 11 to be utilized for replacement. In utilizing the present invention with both valid and invalid combinations of bits A-F, certain remaining combinations are invalid, and these will be detected and an error signalled on line 25 from the LRU error decoder 20. Further details of the valid LRU decoder 19, failure mode LRU decoder 22, and LRU error decoder 20 will be discussed subsequently.

Before discussing details of the logic implementation of the present invention, various properties of the LRU chronology bit codings will be discussed. TABLE II which follows, illustrates that invalid chronology bit codings create a loop that does not convey consistent chronological information. The example in TABLE II assumes an LRU chronology bit coding utilizing three binary bits, this being the smallest set associative case of interest. In the table, M, N, and O represent three units, the sequence of use of which is to be coded.

TABLE II

|  | Bit = 1 | Bit = 0 |
|---|---|---|
| Bit 1 | M after N | N after M |
| 2 | M after O | O after M |
| 3 | N after O | O after N |

Possible states of bits 1, 2 and 3

|  | 1 | 2 | 3 |
|---|---|---|---|
| State 1 | 0 | 0 | 0 |
| 2 | 0 | 0 | 1 |
| 3 | 0 | 1 | 0 |
| 4 | 0 | 1 | 1 |
| 5 | 1 | 0 | 0 |
| 6 | 1 | 0 | 1 |
| 7 | 1 | 1 | 0 |
| 8 | 1 | 1 | 1 |

In accordance with the teachings of the above referenced article by J. L. Craft entitled "Parallel Validity Checking Of Ordering For Ranking Vectors", it is seen that valid sequence codings do not contain closed loops while the invalid sequences do contain closed loops. Of the eight possible combinations of bits 1, 2 and 3 of TABLE II, the combination shown for states 3 and 6 are invalid codings of sequences for units of the associativity greater than 2. Invalid sequences can be easily detected by graphing the code combinations of each sequence.

For the four-way associative case (six LRU chronology bits), the code combinations XXX010 and XXX101 never appear in a valid coding of sequences (X being don't care states). When a fault occurs in one or more of the sections of the high speed buffer 11 or the address array 12, the first three bits of the LRU chronology coding can be used to indicate which section of the high speed buffer or address array should no longer be selected for use or replacement. This coding used for the first three bits is fault tolerant. That is, when the maintenance control 21 shown in FIG. 2 identifies faulty units, certain codings can be forced by the maintenance control 21 for use in the failure mode LRU decoder 22 of FIG. 2. This point is demonstrated in the following description of the fault tolerant LRU algorithm which is used after a fault occurs.

It will now be assumed that there are four units M, N, O, and P to be ordered in accordance with a fault mode operation of LRU chronology coding. TABLE III and TABLE IV shown below represent two groupings of otherwise invalid chronology bit code combinations to be utilized when units M or N are faulty, or O or P are faulty respectively.

TABLE III

| M or N Faulty | |
|---|---|
| *001010 | *001101 |
| 011010 | 011101 |
| 101010 | 101101 |
| 000010 | 000101 |

*possible starting points

TABLE IV

| O or P Faulty | |
|---|---|
| *110010 | *110101 |
| 010010 | 010101 |
| 100010 | 100101 |
| 111010 | 111101 |

*possible starting points

If unit M or N is faulty, the first three bits of the LRU chronology coding shown in TABLE III will represent this fact. If unit O is least recently used, then this will be signified by the last three bits of the chronology bit coding assuming the combination 010. If unit P is the least recently used, the last three bits of the chronology coding will assume the combination 101. If either unit M or N is detected as being faulty by the maintenance control 21 of FIG. 2, the maintenance control 21 will force the chronolgy bit coding into a combination 001010 or 001101. As shown in Table III, a single bit failure in the first three bit positions which creates any of the combinations shown in Table III can still be utilized to identify the fact that unit M or N is faulty and continue to have the remaining three bits identify the sequence of use of units O or P.

If unit O or P become faulty, the maintenance control 21 of FIG. 2 will force the chronology bits to assume the combination 110010 or 110101. Again, if a failure occurs in the first three bit positions resulting in the combination shown in Table IV, the identity of the faulty units O or P will be maintained.

Figure 3A:
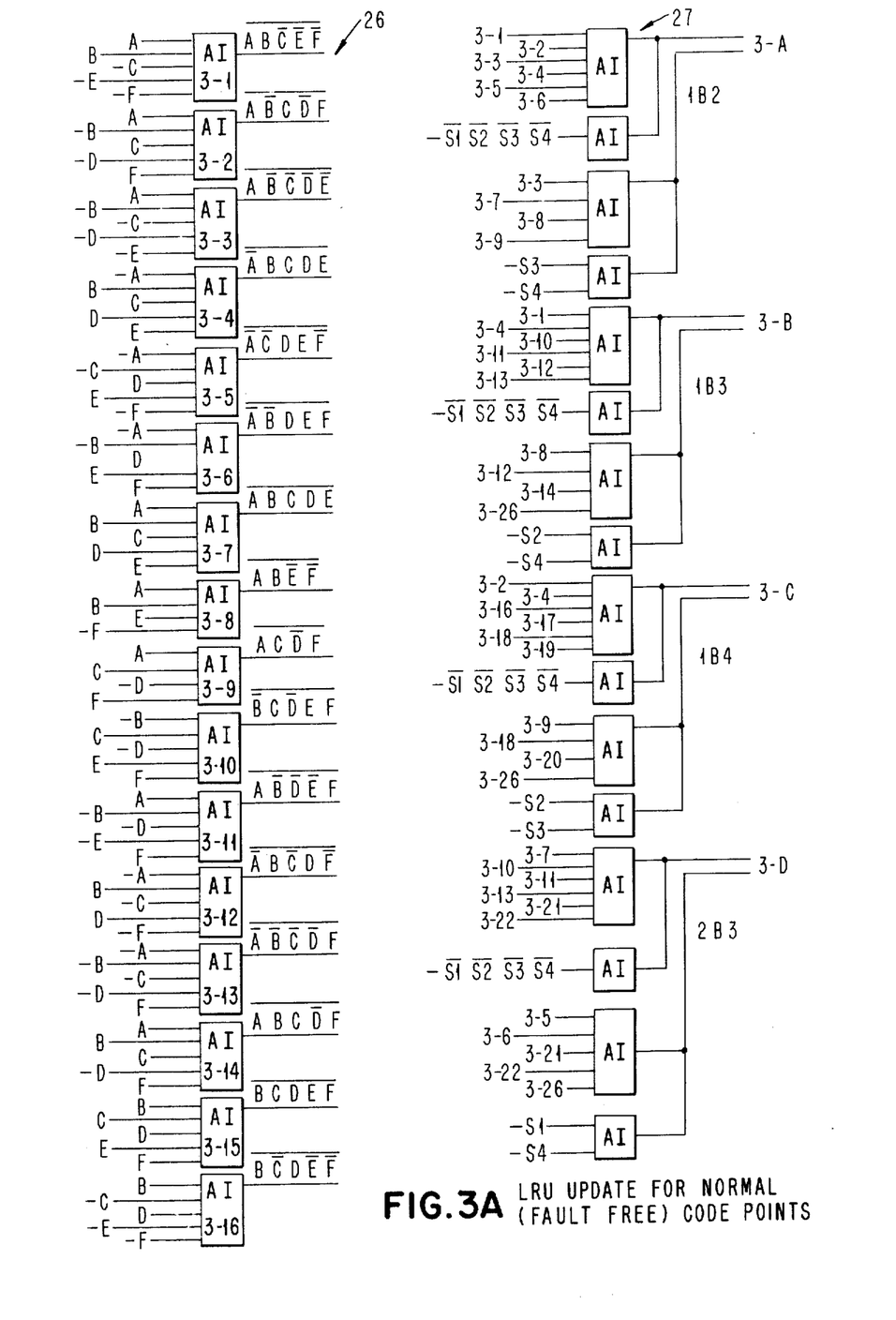
FIG. 3A and FIG. 3B, taken together, show the logic for updating chronology bits of an LRU algorithm in a fault free environment.
Figures 3B, 4, 6, 7:
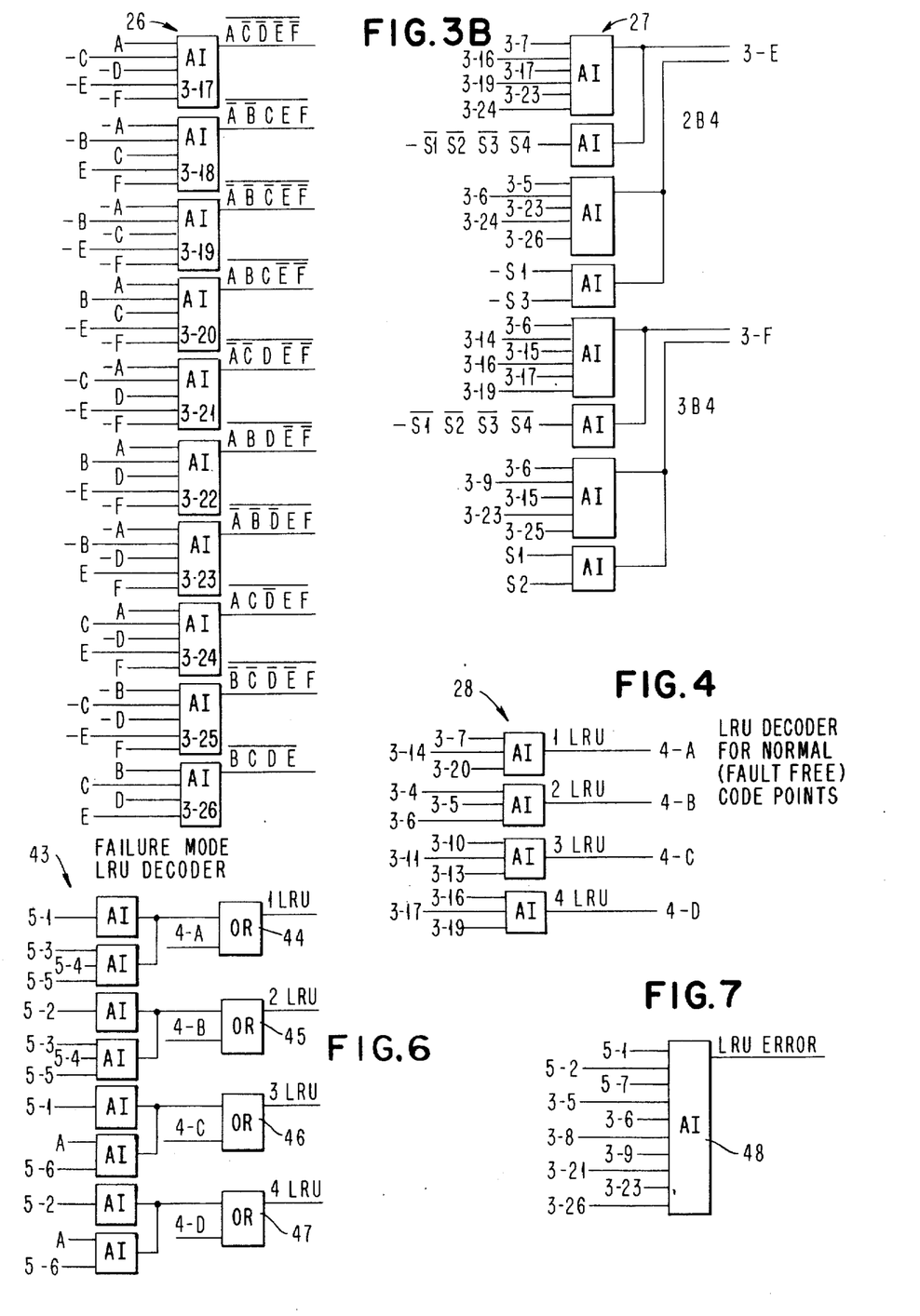
FIG. 4 is a logic diagram of a decoder of chronology bits to identify a particular one of a plurality of units least recently used.
FIG. 6 is a logic diagram of the chronology bit decoder, in a failure mode, identifying a least recently used unit.
FIG. 7 shows the logic necessary to indicate that either the fault free or fault mode LRU apparatus has produced an error.

The valid LRU decoder 19 of FIG. 2 is shown in more detail in FIGS. 3A and 3B. On the left side of FIGS. 3A and 3B are shown a series of AND-INVERT (AI) circuits noted generally at 26 and labeled in a series, 3-1, 3-2 through 3-26. The AI circuits 26 receive as inputs the present coding of chronology bits A through F received from storage 18 in FIG. 2, and provide outputs to another series of AI circuits noted generally at 27. The series of AI circuits 27 which receive the outputs from the AI circuits 26, representing the present coding of the chronology bits, also receive select signals S1, S2, S3, and S4, or the absence thereof, of compare circuit 13 of FIG. 1. The resulting output from the series of AI circuits 27 labeled 3-A, 3-B, etc. represent the new state to be assumed by the chronology bits A through F, and follow logically the results shown in accordance with the coding of Table I.

That portion of the valid LRU decoder 19 of FIG. 2 which responds to the present coding of the chronology bits A through F, when the compare circuit 13 of FIG. 1 indicates that no compare has taken place, and that a replacement must be accomplished, is shown in FIG. 4. A series of AI circuits, shown generally at 28, respond to the present coding of the chronology bits as indicated by the series of AI circuits 26 in FIG. 3, to signal which of the four sections of the high speed buffer has been the least recently used.

Figure 5:
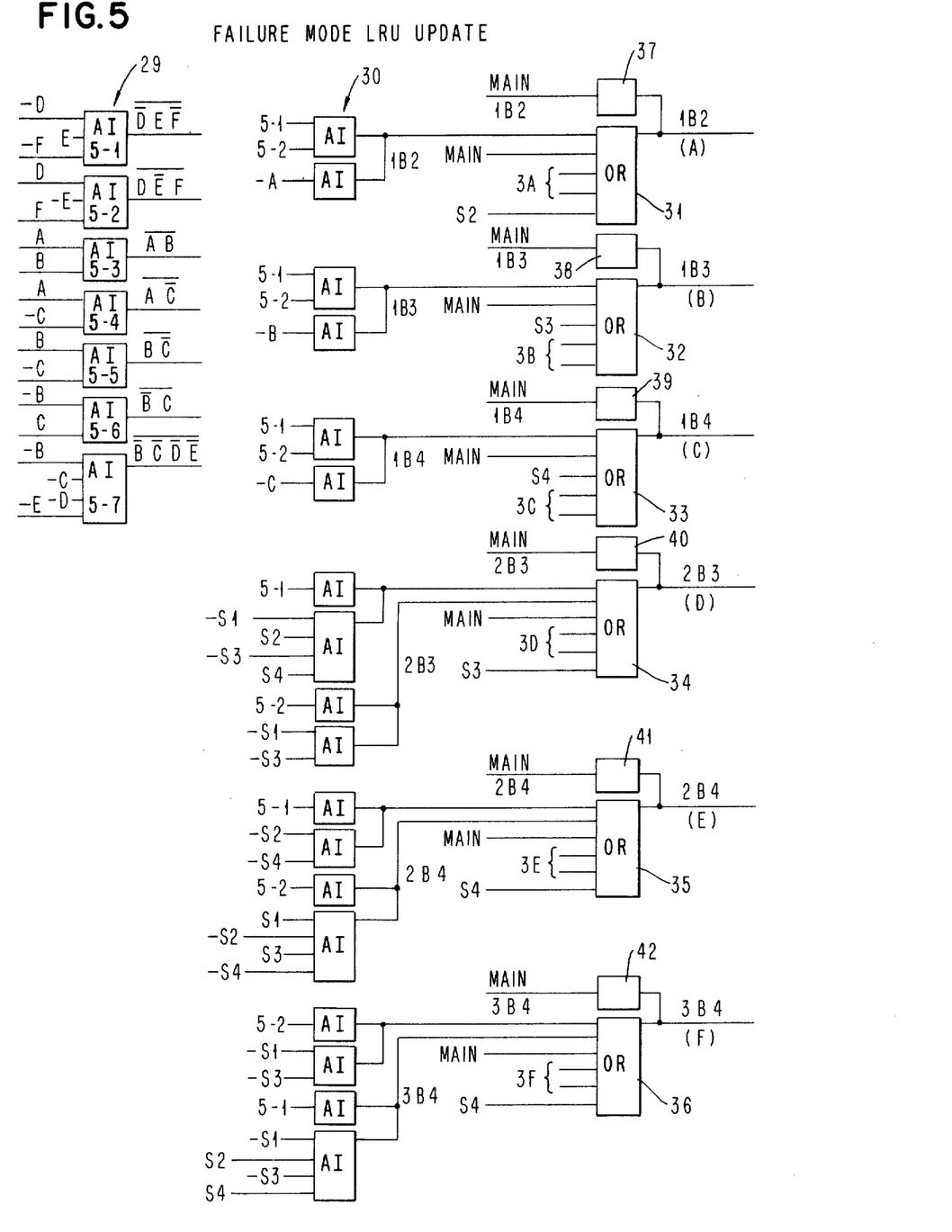
FIG. 5 is a logic diagram of LRU chronology bit updating in a fault mode condition.

The failure mode LRU decoder 22 of FIG. 2 is shown in more detail in FIG. 5. The decoder 22 is comprised of a series of AI circuits 29 and 30 which decode the present status of the chronology bits A through F when the maintenance control 21 of FIG. 2 indicates that certain portions of the high speed buffer 11 or address array 12 of FIG. 1 are faulty. The coding of the AI circuits 29 and 30 follow the coding shown in Tables III and IV.

The outputs of FIG. 5 labeled 1B2 (A), 1B3 (B), etc. are derived from a series of OR circuits 31 through 36 or from a series of drivers 37 through 42. In response to error conditions in the high speed buffer system, the maintenance control 21 of FIG. 2 will be effective to generate signals from the drivers 37 through 42 to force the chronology bits A through F into the code patterns shown in Tables III and IV. Thereafter, OR circuits 31 through 36 respond to the series of AI circuits 30 of FIG. 5, the AI circuits 27 of FIG. 3, or select signals S1-S4 from compare circuit 13 of FIG. 1, to provide updated chronology bits coded to show the sequence of use of the four sections of the high speed buffer 11 of FIG. 1.

FIG. 6 shows detailed logic of that portion of the failure mode LRU decoder 22 of FIG. 2 which responds to the present coding of the chronology bits, when in a fault mode condition, to signify which of the still operable sections of the high speed buffer 11 of FIG. 1 is the least recently used. A series of AI circuits, shown generally at 43, respond to the series of AI circuits 30 of FIG. 5 and certain of the chronology bits, to provide an indication of the section least recently used. A series of OR circuits 44 through 47 respond either to the series of AI circuits 43 when in the failure mode, or the series of AI circuits 28 of FIG. 4 when in the fault free mode, to signal the particular one of the four sections of the high speed buffer 11 of FIG. 1 to be selected to receive the new data being entered.

In FIG. 7, there is shown an AI circuit 48 which responds to certain of the AI circuits 26 of FIG. 3 and certain of the AI circuits 29 of FIG. 5, to generate an LRU error signal when certain code combinations of chronology bits are detected indicating an error in the coding, when either in the fault free or fault mode of operation. Table V shown below represents the chronology bit codings of all valid code combinations whether in fault free or fault mode of operation, the designation X being chronology bit codings which do not enter into a determination of valid or invalid codings. At circuit 48 responds to the absence of any of the codings shown in Table V to signal the error condition.

TABLE V

| A<br>1B2 | B<br>1B3 | C<br>1B4 | D<br>2B3 | E<br>2B4 | F<br>3B4 |
|---|---|---|---|---|---|
| 0 | 0 | X | X | 1 | 1 |
| 1 | X | 1 | 0 | X | 1 |
| 1 | 1 | X | X | 0 | 0 |
| 0 | X | 0 | 1 | X | 0 |
| X | 1 | 1 | 1 | 1 | X |
| X | 0 | 0 | 0 | 0 | X |
| X | X | X | 1 | 0 | 1 |
| X | X | X | 0 | 1 | 0 |

ALTERNATE EMBODIMENTS

In the detailed description above, if one section of a high speed buffer becomes faulty, a companion section is also removed to thereby retain a coding of chronology bits which can tolerate further errors in the coding mechanism and still retain the ability to signify the sequence of the non-faulty units. Other chronology bit coding combinations can be implemented with logic, when in a failure mode, to utilize normally invalid chronology bit codings to provide an indication of a single section being faulty, and still retain the ability to code the sequence of use of the remaining three operable sections.

Table VI shown below represents a coding technique in which certain of the chronology bits A through F can be forced to assume a bit pattern to signify which one of the four sections of the high speed buffer is faulty. For example, chronology bits D, E, and F (noted by X) are forced to assume a 010 pattern to signify that section 1 is faulty, chronology bits A, C, and E can assume the bit pattern 010 to signify that section 2 is faulty, etc.

TABLE VI

| XXX ABCDEF | X X X ABCDEF | XX X ABCDEF | XX X ABCDEF |
|---|---|---|---|
| 000010 | 001000 | 010001 | 100100 |
| 001010 | 001001 | 010011 | 100101 |
| 011010 | 001101 | 010111 | 100111 |
| 100010 | 011000 | 110001 | 101100 |
| 110010 | 011100 | 110101 | 101110 |
| 111010 | 011101 | 110111 | 101111 |
| 1-Faulty | 2-Faulty | 3-Faulty | 4-Faulty |

Table VII below shows the manner in which the codings represented in Table VI are utilized to indicate the sequence of use of operable units for the four possible conditions of a single faulty unit. For example, if section 1 is faulty as represented by the coding of chronology bits D, E and F, the remaining chronology bits A, D and C can be updated and utilized to signify the least recently used one of the remaining operable sections 2, 3 and 4. The same reasoning holds true for the remaining three conditions of a single faulty section.

TABLE VII

SECTION 1 – FAULTY

| Chronology Sequence | Bit A 2B3 | Bit B 2B4 | Bit C 3B4 |
|---|---|---|---|
| 234 | 1 | 1 | 1 |
| 243 | 1 | 1 | 0 |
| 324 | 0 | 1 | 1 |
| 342 | 0 | 0 | 1 |
| 423 | 1 | 0 | 0 |
| 432 | 0 | 0 | 0 |

SECTION 2 – FAULTY

| Chronology Sequence | Bit B 1B3 | Bit D 1B4 | Bit F 3B4 |
|---|---|---|---|
| 134 | 1 | 1 | 1 |
| 143 | 1 | 1 | 0 |
| 314 | 0 | 1 | 1 |
| 341 | 0 | 0 | 1 |
| 413 | 1 | 0 | 0 |
| 431 | 0 | 0 | 0 |

SECTION 3 – FAULTY

| Chronology Sequence | Bit A 1B2 | Bit D 1B4 | Bit E 2B4 |
|---|---|---|---|
| 124 | 1 | 1 | 1 |
| 142 | 1 | 1 | 0 |
| 214 | 0 | 1 | 1 |
| 241 | 0 | 0 | 1 |
| 412 | 1 | 0 | 0 |
| 421 | 0 | 0 | 0 |

SECTION 4 – FAULTY

| Chronology Sequence | Bit C 1B2 | Bit E 1B3 | Bit F 2B3 |
|---|---|---|---|
| 123 | 1 | 1 | 1 |
| 132 | 1 | 1 | 0 |
| 213 | 0 | 1 | 1 |
| 231 | 0 | 0 | 1 |
| 312 | 1 | 0 | 0 |
| 321 | 0 | 0 | 0 |

Utilizing the codings shown in Tables VI and VII, logic corresponding to that shown in the figures can be created to provide the necessary chronology updating and decoding for signifying a least recently used section.

Table VIII below shows a further extension of the present invention. The chronology bit coding can be forced to assume certain patterns in a fault situation, to identify the sections of the high speed buffer which are faulty, and the sequence of use of the remaining sections. The coding of Table VIII is such that multiple sections can be faulty, in various combinations, and the combinations identified by the coding. The remaining bits of the chronology coding are utilized to signify the sequence of use of the non-faulty sections.

TABLE VIII

| Chronology Sequence | Faulty Sections | Bit ABC | Pattern DEF |
|---|---|---|---|
| 34 | 12 | 000 | 101 |
| 43 | 12 | 111 | 101 |
| 24 | 13 | 010 | 101 |
| 42 | 13 | 101 | 101 |
| 23 | 14 | 010 | 010 |
| 32 | 14 | 101 | 010 |
| 14 | 23 | 100 | 011 |
| 41 | 23 | 110 | 110 |
| 13 | 24 | 100 | 110 |
| 31 | 24 | 110 | 011 |
| 12 | 34 | 001 | 100 |
| 21 | 34 | 011 | 001 |
| 1 | 234 | 011 | 011 |
| 2 | 134 | 010 | 000 |
| 3 | 124 | 101 | 000 |
| 4 | 123 | 001 | 110 |

While the invention has been particularly shown and described with reference to a preferred embodiment and modifications thereof, it will be understood by those skilled in the art that various other changes in form and details may be made therein without departing from the spirit and scope of the invention.

What is claimed is:

1. A system for producing a binary code signifying the order of use of a plurality of units randomly utilized in sequence including in combination:
   storage means for a binary code;
   select signalling means associated with each of the units for indicating use of the associated unit;
   first logic means, connected to said storage means and said select signalling means, for producing a binary code in said storage means indicating the most recent order of use of the units;
   fault signalling means for indicating units eliminated from further use;
   second logic means, connected to said storage means, said select signalling means, and said fault signalling means, for producing a binary code in said storage means having a first portion identifying the faulty units, and a second portion indicating the most recent order of use of the units not eliminated from further use.

2. A system in accordance with claim 1 which includes n units and wherein said storage means, and thus the binary code includes: x binary storage elements where $x = (n-1) + (n-2) + \ldots (n-1))$, and wherein $n!$ binary bit combinations of the code are valid and $2^x - n!$ binary bit combinations are invalid.

3. A system in accordance with claim 2 wherein said second logic means includes:
   forcing means for producing a particular binary bit combination in said storage means chosen from said $2^x - n!$ invalid bit combinations.

4. A system in accordance with claim 3 wherein said forcing means includes:
   means responsive to said fault signalling means for producing said particular binary bit combination selected from a set of binary bit combinations, said set of binary bit combinations being associated with units eliminated from use and the first portion of which identify the units.

5. A system in accordance with claim 4 further including in combination:
   error detection means, connected and responsive to said storage means for producing an error signal in response to a binary bit combination not included in said valid bit combinations or any of said sets of binary bit combinations.

* * * * *